United States Patent [19]
Blades et al.

[11] Patent Number: 5,465,358
[45] Date of Patent: Nov. 7, 1995

[54] SYSTEM FOR ENHANCING USER EFFICIENCY IN INITIATING SEQUENCE OF DATA PROCESSING SYSTEM USER INPUTS USING CALCULATED PROBABILITY OF USER EXECUTING SELECTED SEQUENCES OF USER INPUTS

[75] Inventors: Jerry A. Blades; Harvey G. Kiel, both of Rochester, Minn.

[73] Assignee: International Business Machine Corporation, Armonk, N.Y.

[21] Appl. No.: 997,398

[22] Filed: Dec. 28, 1992

[51] Int. Cl.⁶ .................................................. G06F 15/40
[52] U.S. Cl. ..................... 395/700; 395/155; 395/600; 364/274.2; 364/274.3; 364/DIG. 1
[58] Field of Search .................... 395/275, 600, 395/700, 155, 156, 157, 158, 159, 160, 161, 650

[56] References Cited

U.S. PATENT DOCUMENTS

| | | | |
|---|---|---|---|
| 4,730,315 | 3/1988 | Saito et al. | 364/200 |
| 4,821,211 | 4/1989 | Torres | 364/521 |
| 4,951,190 | 8/1990 | Lane et al. | 364/200 |
| 4,964,077 | 10/1990 | Eisen et al. | 364/900 |
| 5,067,070 | 11/1991 | Miyao et al. | 395/146 |
| 5,115,501 | 5/1992 | Kerr | 395/600 |
| 5,179,654 | 1/1993 | Richards et al. | 395/157 |
| 5,204,968 | 4/1993 | Parthasarathi | 395/800 |
| 5,239,617 | 8/1993 | Gardner et al. | 364/419.08 |
| 5,263,167 | 11/1993 | Conner, Jr. et al. | 395/700 |
| 5,287,448 | 2/1994 | Nicol et al. | 395/155 |

OTHER PUBLICATIONS

"Guess–Ahead Feature for a Keyboard–Display Terminal Data Input System," F. J. Damerau, Document No. Y0979024, 82–05–18.

"User Interface Shortcut," W. L. Banning, R. B. Wood, Document No. AAA90A062297, TDB n3a 08–90 pp. 413–414.

Inspec Listing, Tech. Disclosure Bull. (USA).

*Primary Examiner*—Thomas C. Lee
*Assistant Examiner*—Moustafa M. Meky
*Attorney, Agent, or Firm*—L. Bruce Terry; Andrew J. Dillon

[57] ABSTRACT

A method and system in a data processing system for enhancing user efficiency in initiating a sequence of data processing system user inputs. Within the data processing system, data processing system stimulus events are identified and stored in a data base. Each sequence of data processing system user inputs which occurs in response to a subsequent occurrence of the identified stimulus event is also stored in the data base. The probability of an occurrence of a selected sequence of data processing system user inputs in response to a subsequent occurrence of the stimulus event is then calculated, utilizing the data base of stored sequences of data processing system user inputs. Upon subsequent recognition of a data processing system stimulus event, one or more selected sequences of data processing system user inputs are identified and displayed, along with an indicated probability of a user executing each identified sequence of data processing system user inputs. Thereafter, in response to a user input, a selected one of the identified sequences of data processing system user inputs may be automatically initiated, thereby enhancing a user's efficiency in performing a sequence of data processing system inputs within said data processing system.

14 Claims, 5 Drawing Sheets

SYSTEM FOR ENHANCING USER EFFICIENCY IN INITIATING SEQUENCE OF DATA PROCESSING SYSTEM USER INPUTS USING CALCULATED PROBABILITY OF USER EXECUTING SELECTED SEQUENCES OF USER INPUTS

BACKGROUND OF THE INVENTION

1. Technical Field

The present invention relates in general to an improved data processing system, and in particular to a method and system for improving the efficiency of initiating data processing system operations within the data processing system. Still more particularly, the present invention relates to a method and system for improving the efficiency of inputting a sequence of user inputs to the data processing system in order to perform a data processing system operation.

2. Description of the Related Art

Frequently, data processing system users must perform repetitious tasks. Such tasks may require a data processing system user to input a sequence of data processing system user inputs which may include commands (including commands which are intended for a specific application or commands intended for the data processing system operating system), data, or other input parameters required to specify a data processing system operation to be performed. Depending upon the application and the operation to be performed, such user input sequences may require numerous user interactions. Such user interactions may be received by the data processing system from a keyboard, a choice device (i.e., a function keyboard), a locator (i.e., a mouse or a tablet), a pick device (i.e., a light pen), or a valuator (i.e., a thumb wheel or a potentiometer). One skilled in the art should also recognize that "user input" need not be limited to input from a human user. User input may include input from one data processing system which is coupled to another data processing system and which requests the other data processing system to perform an operation.

A sequence of data processing system user inputs necessary to perform an operation may be lengthy, and may require a user to utilize several user input devices and navigate through several layers of hierarchical menus, panels, or dialog boxes. For example, to print a document a user may be required to specify the document to be printed, where the document is located in storage, on what paper size the document will be printed, which printer to utilize to print the document, how many copies to print, whether or not to print the entire document, and whether or not the copies should be collated. Such a sequence of data processing system user inputs may be directed either to a particular application or to an operating system. User input sequences may include user interactions which are initially directed to the operating system in order to invoke an application, and are thereafter directed to the application to execute application specific operations.

One known method and system of improving data processing system user input efficiency is to provide menus having menu choices that are periodically reordered based upon the number of times each choice has been chosen. However, such a menu reordering scheme does not reduce or eliminate the interactions required in a user input sequence. The menu reordering scheme only makes it easier to select the same menu choices when entering the user input sequence. Another method and system for improving data processing system user input efficiency is to provide automatic entry of default values in fields within secondary windows or dialog boxes which would otherwise require a user entry or specification. Such fields within secondary windows may be presented either by an application or the operating system. Even though automatic entry of default values reduces the number of key strokes necessary to perform an operation, each secondary window or dialog box must still be displayed and still requires user interaction to accept the automatically entered defaults.

In other known data processing systems, artificial intelligence systems or neural networks have been utilized to predict and perform a sequence of data processing system user inputs which would otherwise require user interaction. For example, if a data processing system user frequently responded to electronic mail messages that contain phone numbers by dialing the phone number after reading the message, the neural network could monitor and learn such user behavior, and subsequently begin to offer to dial phone numbers contained within newly-received electronic mail messages. However, implementation of such artificial intelligence systems requires complex computer resources and is quite expensive.

Therefore, it should be apparent that a need exists for a method and system wherein a data processing system user may automatically initiate a selected sequence of data processing system user inputs to perform a routine data processing system operation.

SUMMARY OF THE INVENTION

It is therefore one object of the present invention to provide an improved data processing system.

It is another object of the present invention to provide a method and system for improving the efficiency of initiating data processing system operations within a data processing system.

It is yet another object of the present invention to provide a method and system for improving the efficiency of inputting a sequence of user inputs to the data processing system in order to perform a data processing system operation.

The foregoing objects are achieved as is now described. A method and system are disclosed in a data processing system for enhancing user efficiency in initiating a sequence of data processing system user inputs. Within the data processing system, data processing system stimulus events are identified and stored in a data base. Each sequence of data processing system user inputs which occurs in response to a subsequent occurrence of the identified stimulus event is also stored in the data base. The probability of an occurrence of a selected sequence of data processing system user inputs in response to a subsequent occurrence of the stimulus event is then calculated, utilizing the data base of stored sequences of data processing system user inputs. Upon subsequent recognition of a data processing system stimulus event, one or more selected sequences of data processing system user inputs are identified and displayed, along with an indicated probability of a user executing each identified sequence of data processing system user inputs. Thereafter, in response to a user input, a selected one of the identified sequences of data processing system user inputs may be automatically initiated, thereby enhancing a user's efficiency in performing a sequence of data processing system inputs within said data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
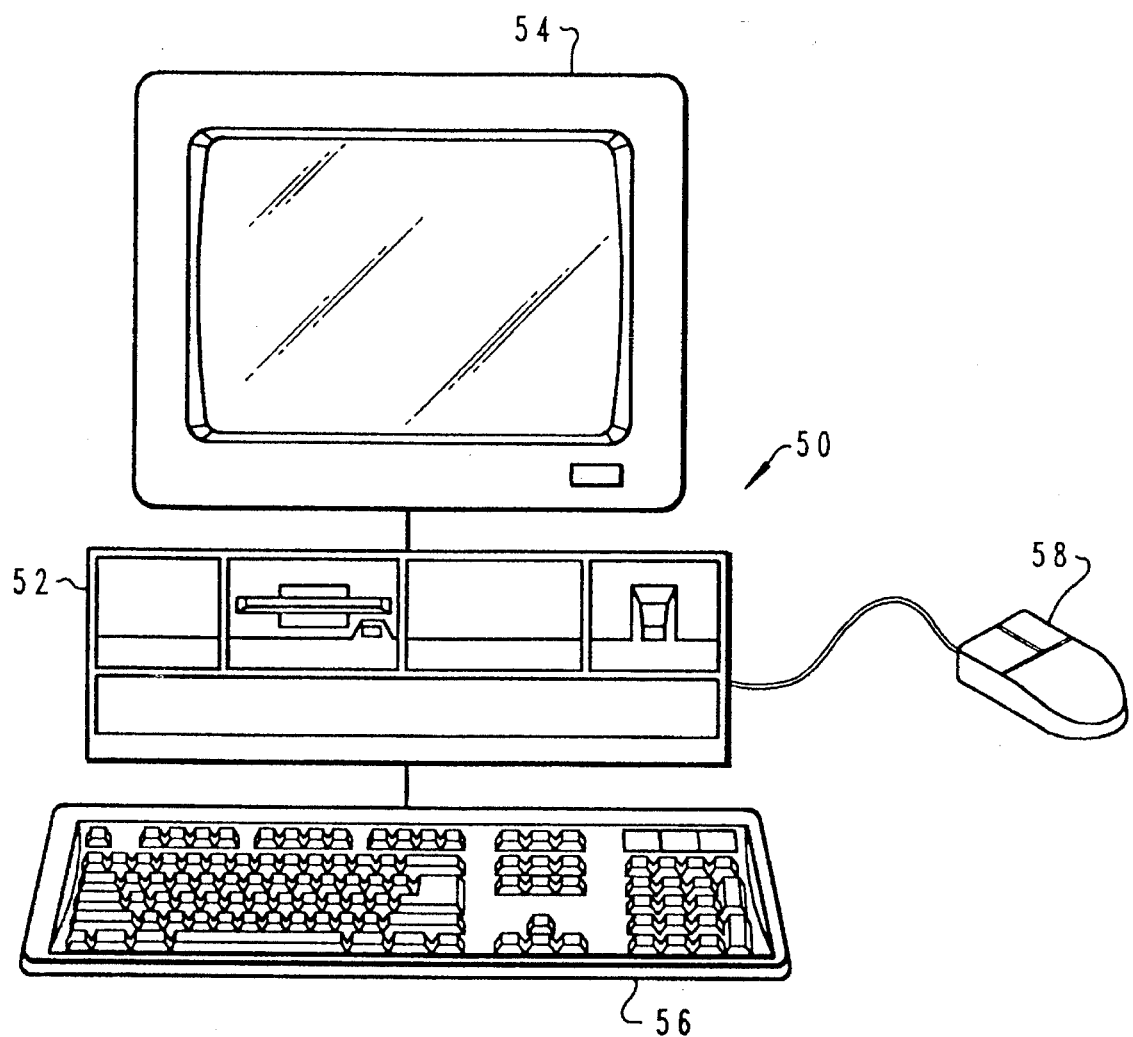
FIG. 1 depicts a pictorial illustration of a data processing system which may be utilized to implement a preferred embodiment of the present invention.

With reference now to the figures and in particular with reference to FIG. 1, there is depicted a pictorial illustration of a data processing system 50 which may be utilized to implement a preferred embodiment of the present invention. Data processing system 50 includes a system unit 52, a video display terminal 54, a keyboard 56, and a mouse 58. Data processing system 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Those skilled in the art will appreciate that the hardware depicted in FIG. 1 may vary for specific applications. For example, other peripheral devices such as: optical disk media, audio adapters, and the like may also be utilized in addition to the hardware depicted. Data processing system 50 may also include video storage devices (not shown) for storing digital data sets in either analog or digital formats. Examples of such video storage devices are laser disk players and video recording devices. Devices for storing, creating or manipulating audio data sets, such as compact disk players, MIDI interfaces, audio effects processors, digital samplers or synthesizers, also may be included in data processing system 50.

Figure 2:
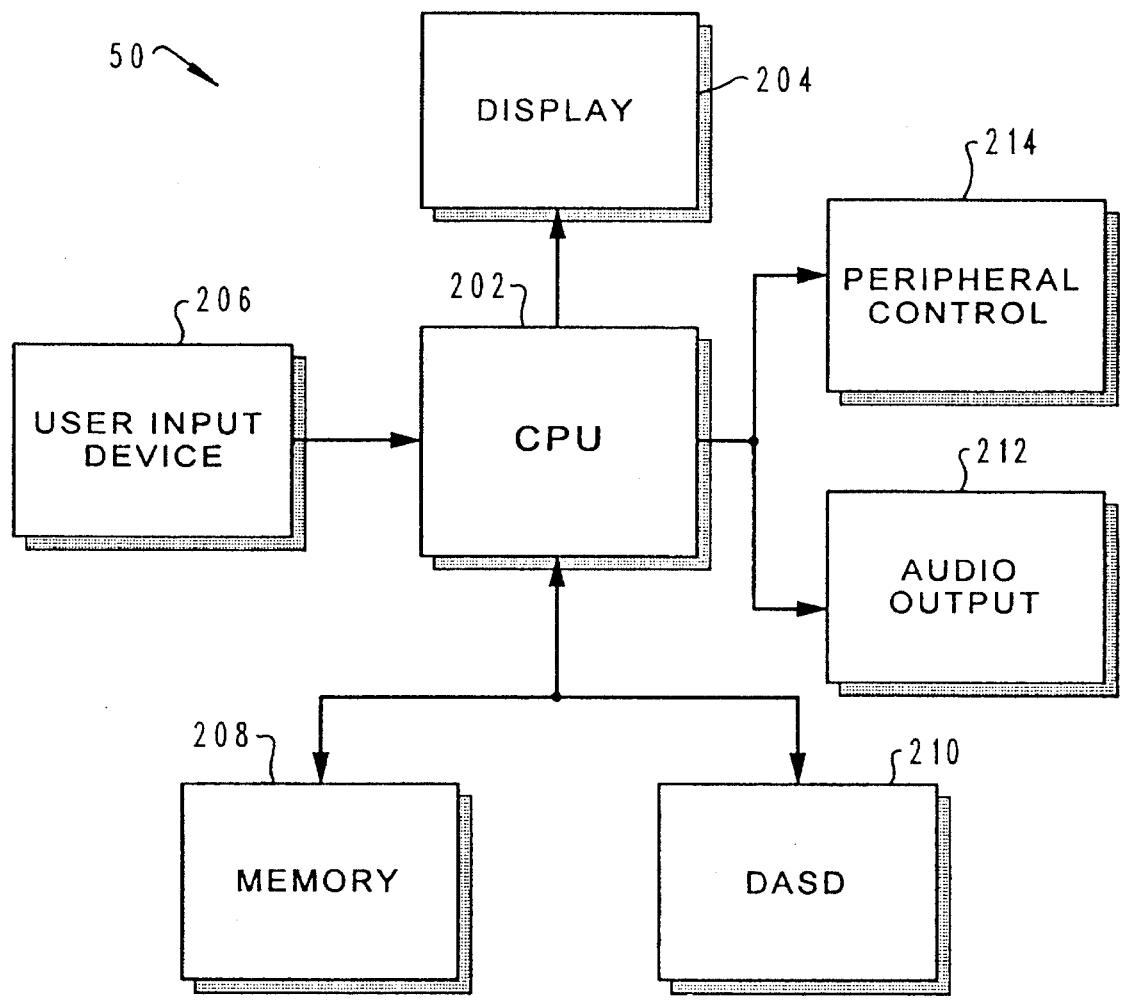
FIG. 2 is a more detailed high level block diagram further illustrating the preferred data processing system of FIG. 1.

FIG. 2 is a more detailed high level block diagram further illustrating the preferred data processing system 50 of FIG. 1. As illustrated, data processing system 50 is controlled primarily by software executed within central processing unit (CPU) 202. CPU 202 is coupled to display 204, and receives user input from user input device 206. CPU 202 is also coupled to memory 208 and one or more direct access storage devices (DASDs) depicted at block 210. Memory 208 and DASD 210 may be utilized for storing data sets and application programs. User input device 206 may be implemented utilizing a mouse, a touch sensitive tablet or screen, a joy stick, a track ball, or a screen activated light pen. CPU 202 may also be coupled to audio output device 212 and peripheral controller 214. Audio output device 212, which may include an amplifier and speaker system, may be utilized to present an audio portion of a multimedia presentation. Peripheral controller 214 may be utilized to control peripheral devices, such as a video player/recorder, a slide projector or a laser disk player (none are shown), during a multimedia presentation. In the depicted embodiment of the present invention, CPU 202 is preferably suitably programmed to implement the process depicted in the flow charts of FIG. 3 and 4 and to provide the displays illustrated within FIG. 5a and 5b.

Figure 3:
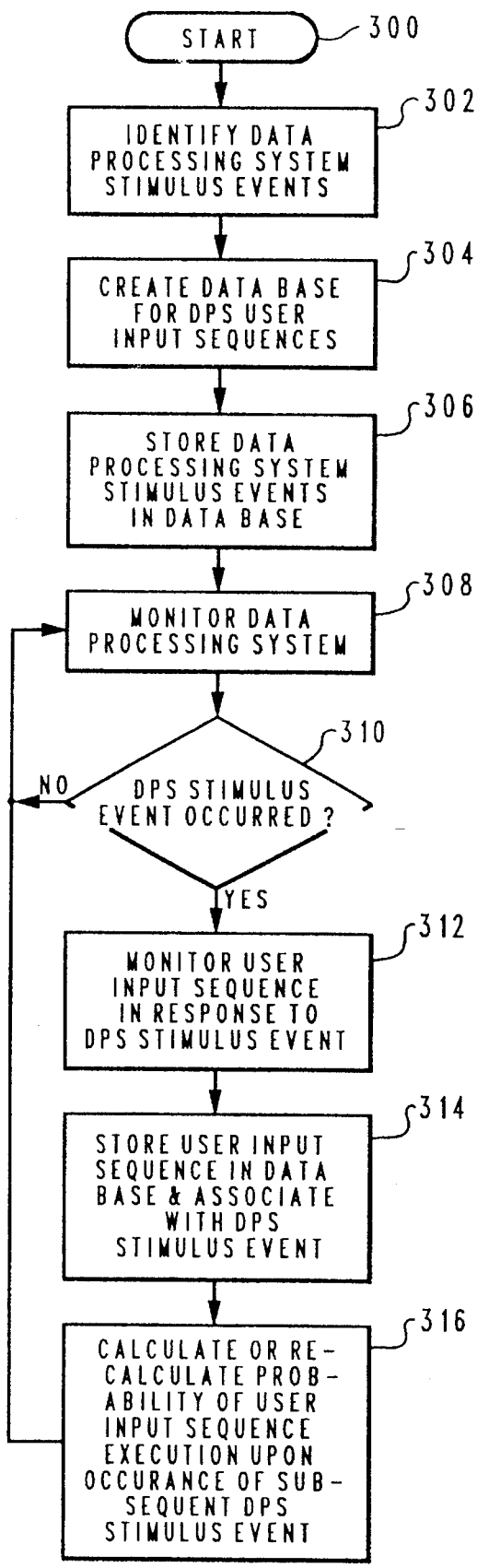
FIG. 3 depicts a flowchart which illustrates the method of creating a database within a data processing system in accordance with the method of the present invention.

With reference now to FIG. 3, there is depicted a flowchart which illustrates the method of creating a database within a data processing system in accordance with the method of the present invention. As depicted, the process begins at terminal block 300 and thereafter passes to block 302 which illustrates the process of identifying data processing system stimulus events. A data processing system stimulus event, as utilized herein, is an event or occurrence within the data processing system which normally invokes a response from a user. For example, starting up or "booting" a computer in the morning when a user arrives at work may be identified as a data processing system stimulus event. Such a data processing system stimulus event may invoke the response from a user of opening an office management program and displaying a schedule of events for that day. Another example of a data processing system stimulus event may be the display of an error message following an unsuccessful attempt to compile a computer program. Such an error message following an unsuccessful compile operation may invoke a user to open a software editing program in order to correct the portion of code which caused the compiler to fail. Those skilled in the art will recognize that a data processing system stimulus event may be defined in conjunction with the time, date, or day of the week of the occurrence of the stimulus event. For example, booting a data processing system may be identified as a data processing system stimulus event only if the data processing system is booted before 9:00 a.m.

In accordance with a preferred embodiment of the present invention, a user, a software manufacturer, or other qualified individual may be required to identify the data processing system stimulus events. However, those skilled in the art will appreciate that additional data processing system stimulus events may be identified by the data processing system itself by utilizing artificial intelligence or neural networks. A data processing system which employs artificial intelligence may demonstrate the capability to perform functions that are normally associated with human intelligence, such as reasoning, learning, and self improvement. For example, a data processing system utilizing artificial intelligence software may learn that a data processing system user, upon receipt of an electronic mail message which contains a phone number, will usually dial the phone number after reading the electronic mail message, if it is before 9:00 a.m. Thereafter, if an electronic mail message containing a phone number is received and read before 9:00 a.m., the artificial intelligence software may then identify the receipt and display of an electronic mail message containing a phone number as a data processing system stimulus event which invokes the user response of dialing the phone number within the electronic mail message.

Continuing to the next step, block 304 depicts the creation of a database for storing data processing system user input sequences within the data processing system. Data processing user input sequences may include inputs from input devices such as a keyboard, a function keyboard, a mouse or tablet, a light pen, or a thumb wheel or potentiometer. User input may also include any method of interaction with the data processing system that accomplishes an operation within the data processing system. User input may include data, commands, or parameters input to the data processing system in order to specify or initiate a data processing system operation. Those persons skilled in the art will appreciate that user input may come from human interaction with the data processing system, or from one data processing system which may be utilized to control another.

Next, as depicted at block 306, the process stores the data processing system stimulus events in the database. Thereafter, the process monitors the data processing system for the occurrence of a data processing system stimulus event, as illustrated at block 308 and decision block 310. If a data processing system stimulus event does not occur, the process continues to monitor the system. If a data processing system stimulus event has occurred, the process then monitors the user input sequence in response to the particular data processing stimulus event, as illustrated at block 312. The process then stores the user input sequence in the database and associates the user input sequence with the particular data processing system stimulus event, as depicted at block 314. Those persons skilled in the art should recognize that authors may include default user input sequences along with system software or application software, which the author believes a user may wish to execute upon the occurrence of an associated data processing stimulus event. The default user input sequences may be stored in the data base when the software is installed in the data processing system.

Finally, as illustrated at block 316, the process calculates or recalculates the probability that the user input sequence will be executed upon a subsequent occurrence of the associated data processing system stimulus event. That is, the calculated probability represents the likelihood that the stored user input sequence will be executed by the user when the associated data processing stimulus event occurs again. From block 316, the process continues to monitor the data processing system for another data processing stimulus event, as depicted at blocks 308 and 310.

Figure 4:
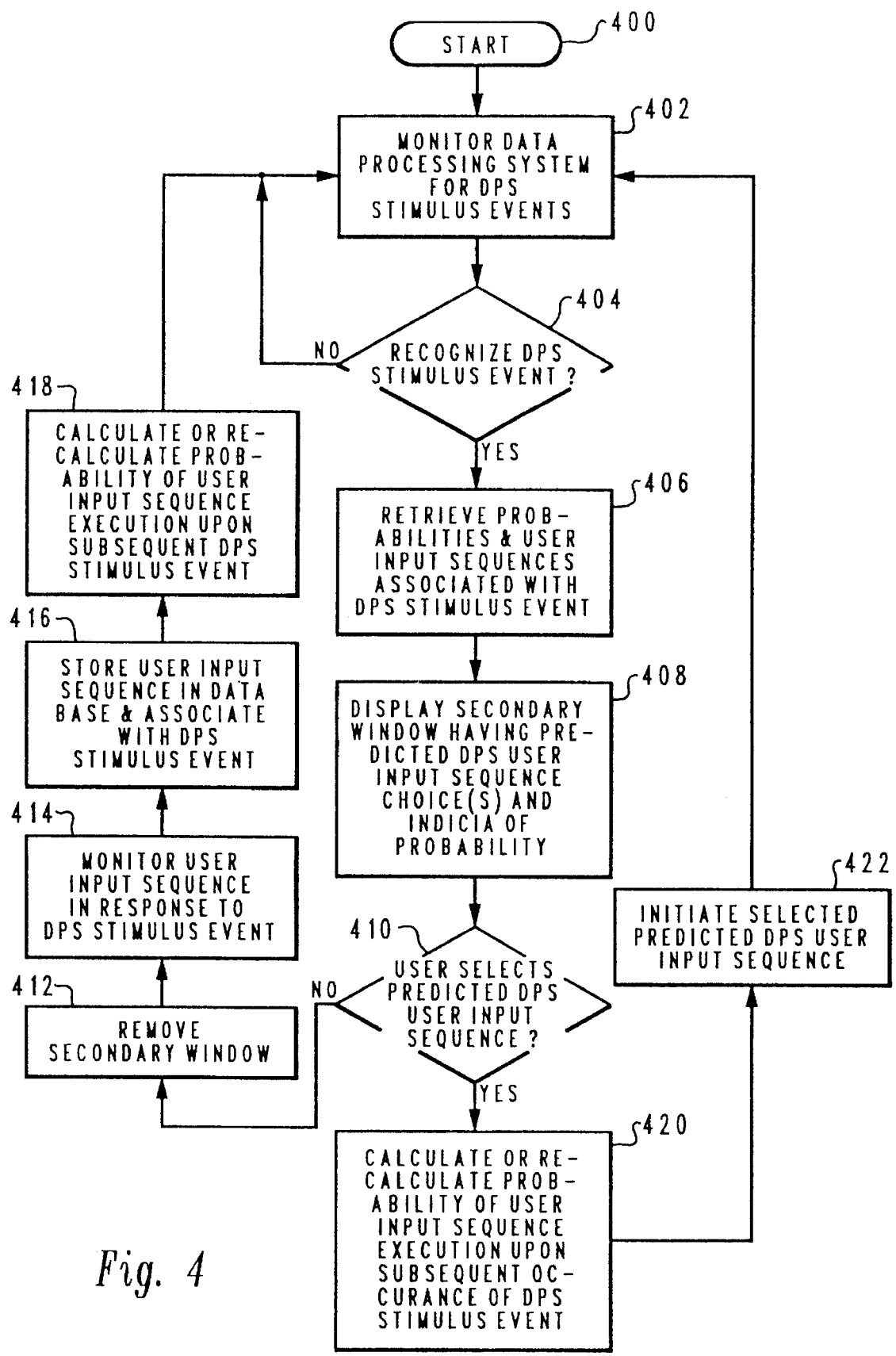
FIG. 4 illustrates the method of automatically displaying a choice of a selected data processing system user input sequence and indicating the probability that the selected sequence will be executed by the user.

With reference now to FIG. 4, there is depicted a flowchart which illustrates the method of automatically displaying a choice of a selected data processing system user input sequence and indicating the probability that the selected sequence will be executed by the user. Those persons skilled in the art should recognize that a selected data processing system user input sequence may include a data processing system user input sequence selected from the data base of stored data processing system user input sequences, or a predicted data processing system user input sequence, which may be an entirely new data processing system user input sequence or a modification of a stored data processing system user input sequence. As illustrated, the process begins at block 400 and thereafter passes to block 402 which illustrates the process of monitoring the data processing system for a data processing system stimulus event. As depicted at decision block 404, the process returns to block 402 if the process does not recognize a data processing system stimulus event.

If the process recognizes a data processing system stimulus event, the process proceeds to block 406 which depicts the retrieval, from the database, of the calculated and stored probabilities, and the data processing system user input sequences associated with the recognized data processing system stimulus event. Thereafter, the process displays a secondary window having one or more choices of predicted data processing system user input sequences, as illustrated at block 408. Such choices of predicted data processing system user input sequences are displayed with a concomitant graphic indication of the probability that a user will execute the predicted data processing system user input sequence.

Those persons skilled in the art will recognize that the display of a predicted data processing system user input sequence may take several forms, such as for example, a list of commands, data, and other input parameters necessary to perform a data processing system operation. Another example may be the display of a secondary window containing a block diagram or decision tree representing data processing system operations that may be performed, or representing a series of panels a user may otherwise be required to interact with in order to instruct a data processing system to perform a specific operation. Such a series of panels may be displayed utilizing a graphical structure similar to a decision tree. Each panel may display default settings of commands, data, or parameters that would normally be entered by a user as the data processing system prompts the user, utilizing that panel. After such a panel tree is displayed, a user may choose to modify commands, data, or parameters in an intermediate panel (a panel that is not the last panel in a series of panels), or a user may choose to accept the default values displayed and invoke a particular data processing system operation by making a selection in a final panel displayed in the panel tree. The display of predicted data processing system user input sequence choices will be discussed in greater detail with respect to FIG. 5.

After displaying predicted data processing system user input sequence choices, as depicted at block 408, the process allows a user to initiate a selected predicted data processing system user input sequence, or to ignore the displayed predicted data processing system user input sequences, as illustrated at decision block 410. If a user ignores the displayed choices, the process removes the displayed choices of predicted data processing system user input sequences within the secondary window, as illustrated at block 412. The process then monitors the user input sequence which is input in response to the data processing system stimulus event recognized previously, as depicted at block 414. The user input sequence is then stored in the database and associated with the recognized data processing system stimulus event, as depicted at block 416. Thereafter, the process calculates or recalculates the probability of a user executing each user input sequence associated with the recognized data processing system stimulus event, upon a subsequent occurrence of the recognized data processing system stimulus event, as illustrated at block 418. The process then resumes monitoring the data processing system for data processing system stimulus events, as depicted at block 402.

Referring again to decision block 410, if a user selects a predicted data processing system user input sequence, the process then calculates or recalculates the probability of a user executing each stored user input sequence upon a subsequent occurrence of the recognized data processing system stimulus event. Those skilled in the art will appreciate that each time a data processing system user selects a predicted data processing system user input sequence, or ignores the choices of predicted data processing system user input sequences and inputs a new user input sequence, the probability that a user will execute other user input sequences associated with a particular data processing system stimulus event may change. Finally, the process initiates the selected predicted data processing user input sequence, as illustrated at block 422, and the process returns to monitoring the data processing system for data processing system stimulus events, as illustrated at block 402. As the process initiates the selected user input sequence, the process provides the data processing system with the instructions necessary to perform the selected data processing system operation.

Figure 5A:
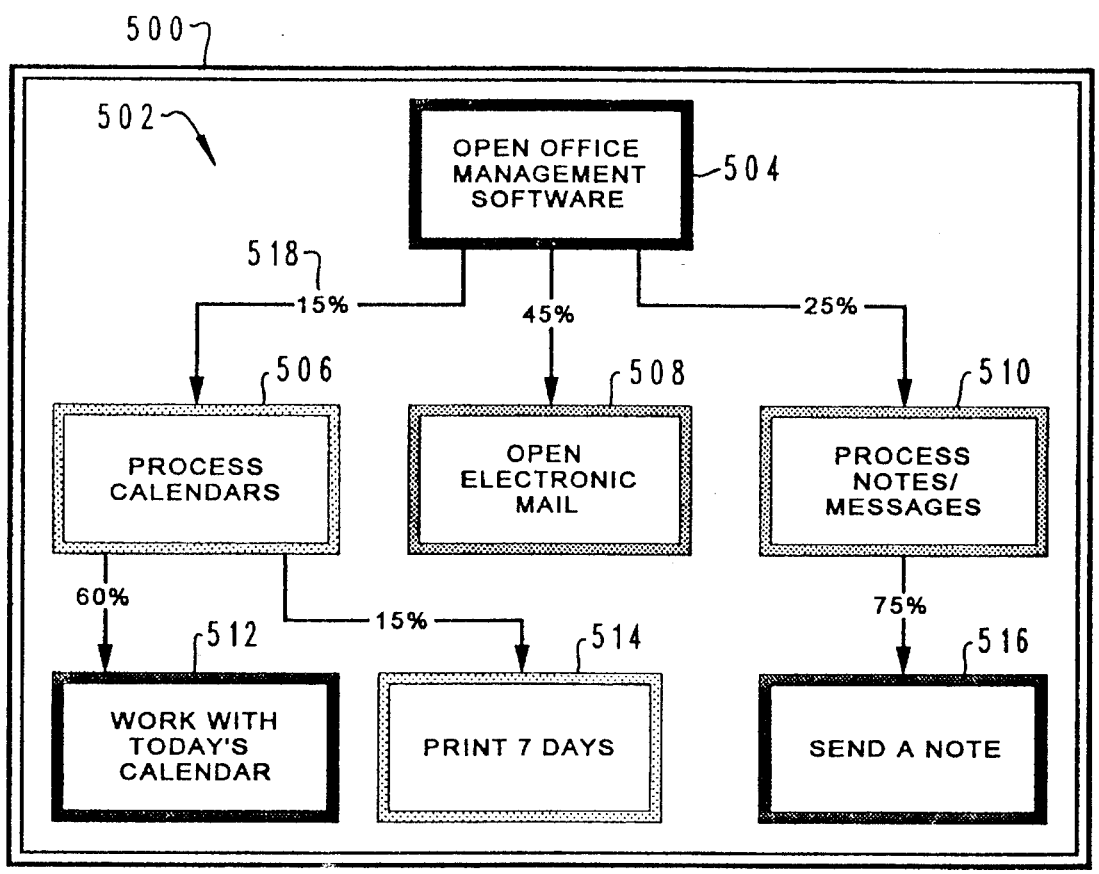
FIGS. 5a and 5b depict examples of a displayed secondary window which presents a data processing system user with selected data processing user input sequence choices and graphically displays a probability which represents the likelihood that the user will select each particular user input sequence.
Figure 5B:
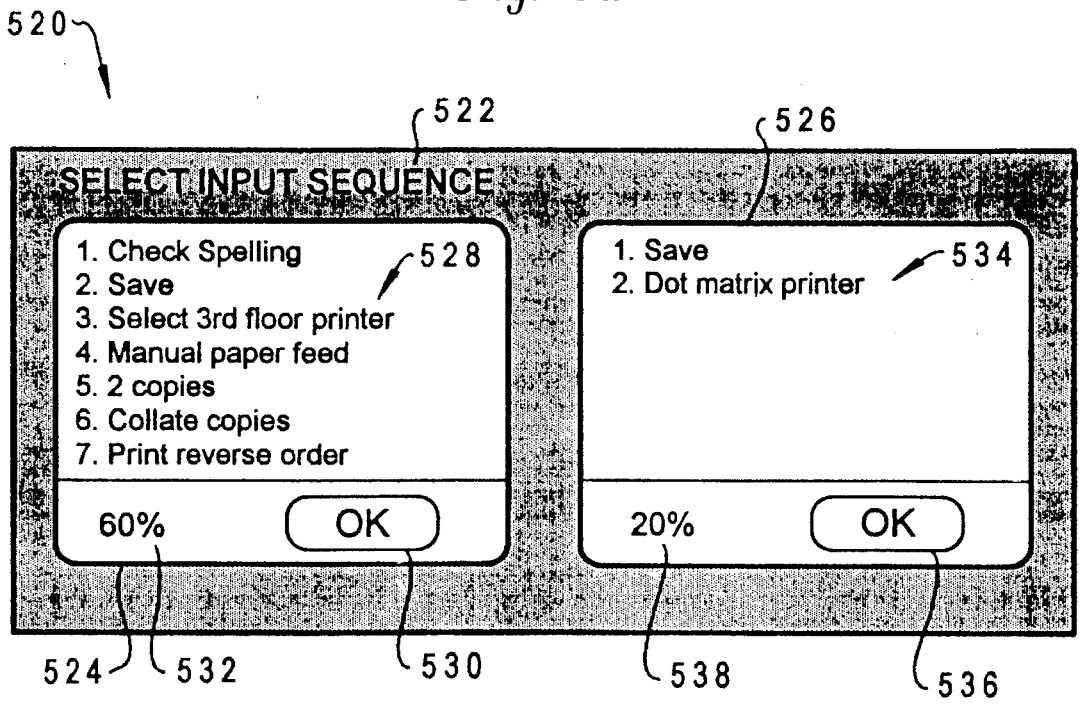

With reference now to FIGS. 5a and 5b, there is depicted two examples of a displayed secondary window which presents a data processing system user with predicted data processing user input sequence choices and graphically displays a probability which represents the likelihood that the user will select each particular user input sequence. As discussed previously, once the process has recognized a data processing system stimulus event and retrieved the probabilities and the data processing system user input sequences associated with the recognized data processing system stimulus event, a secondary window is displayed. The purpose of this secondary window is to indicate to a data processing system user the available choices of predicted data processing system user input sequences and the probability that a user will select each of the available choices. Those persons skilled in the art will appreciate that there are many methods and graphical user interface items which may be utilized to communicate such available choices and their respective probabilities, such as for example, push buttons, radio buttons, check boxes, pop-up and pull-down menus, cascaded menus, icons, or other dialog boxes or menus. Blocks 502–514 represent user selectable areas of the display which a user may select by utilizing an appropriate user input device, such as a mouse.

Upon user selection of one of blocks 504–516, a predicted data processing system user input sequence may be initiated within the data processing system, as indicated by the textual label within each block. For example, if a user selects block 504 which contains the textual label "open office management software," the process will initiate the data processing system user input sequence necessary to open the office management software package within the data processing system.

Similarly, if a user selects block 506 within panel tree 502, the process initiates the data processing system user input sequence necessary to open the office management software and subsequently initiates, the data processing system user input sequence necessary to invoke the calendar portion of the office management software. Similarly, if a user wishes to work with today's calendar, the user may select block 512 and the process will initiate the data processing system user input sequence necessary to open the office management software, then invoke the portion of the office management software which processes calendars, and finally invoke the portion of software to work with the calendar for the current date. As shown in the present implementation of panel tree 502, lines and arrows may be utilized to connect blocks and indicate which data processing system user input sequences may be concatenated to form a longer sequences of user inputs.

Probability indicator 518 may be positioned along a line connecting two blocks to indicate the probability that a user will select a connected block in order to initiate an indicated data processing system user input sequence. For example, probability indicator 518 indicates that after a user has invoked the office management software program, there is a 15% probability a user will select block 506 to process calendars, a 45% probability a user will select block 508 to open electronic mail, and a 25% probability that a user will select block 510 to process notes or messages.

The probability of a user selecting a particular block may also be graphically indicated, as shown by the various shading surrounding blocks 506, 508, and 510, wherein the darker shading represents a higher probability. One skilled in the art should recognize that there are many methods which may be utilized to indicate the probability of a data processing user selecting a particular block, such as, for example, variations in color, size, and placement.

Within panel tree 502, blocks 504–516 may also represent various dialog boxes or user input opportunities presented to a user by the data processing system as the user attempts to initiate a particular data processing system operation. For example, a user may wish to perform the data processing system operation of accessing a calendar for the current date, as indicated by block 512. In order to access today's calendar, a user may normally be required to open the office management software, then access the menu or dialog box necessary to invoke the calendar processing section of the office management software, and finally the user must interact with a dialog box or menu to access the calendar for the current date. Each menu or dialog box may require several user interactions to select or provide the necessary data to the office management software in order to bring up the calendar for the current date. Each block along the path of blocks representing the path of menus or dialog boxes a user would normally see displayed, may contain default values or data that would have been entered by the user had the user navigated through the conventional menus and dialog boxes necessary to display today's calendar. By selecting the last block in the series of blocks, the user accepts the menu choices and data shown in the previous blocks and initiates a data processing system operation utilizing such accepted menu choices and data.

Finally now with reference to FIG. 5b, there is depicted a secondary window 520 which may be utilized to display predicted data processing system user input sequence choices and the indicia of the probability that each displayed choice will be executed by the data processing system user. Secondary window 520 may contain instructions 522 along with user input sequence choice boxes 524 and 526. Within user input sequence choice box 524, there is displayed a list of user interactions 528, a user selectable field 530, and a probability indicator 532. Similarly, user input sequence choice box 526 contains list of user interactions 534, user selectable field 536, and probability indicator 538.

List of user interactions 528 is displayed within user input sequence choice box 524 to inform a data processing system user of the data processing system user input sequence which will be initiated within the data processing system upon selection of user selectable field 530. In this example, list of user interactions 528 informs a user of a word processing application that upon selecting user selectable field 530, the process, by following the direction of the selected user input sequence, will invoke the spelling checker to check spelling within the document, initiate a save operation to save the document to disk, specify that the document will be printed utilizing a printer located on the third floor, specify that the printer use manually fed paper, specify that two copies of the document be printed, specify that the copies be collated, and finally, specify printing in reverse order wherein the last page is printed first and the first page is printed last. Moreover, the items within list of user interactions 528 may be selectable, and upon selection may display a menu or dialog box wherein a user may change the selected item.

Similarly, list of user interactions 534 contained within user input sequence choice box 526 contains a sequence of data processing system user inputs. However, this sequence of user inputs produces a much different result. List of user interactions 534 contains two items in the list and, upon selection of user selectable field 536, the process will initiate a save operation which will save the document to disk and specify that the document be printed on a dot matrix printer. List of user interactions 534 represents a user input sequence which may be utilized to print a draft of a document, rather than a final copy.

Probability indicators 532 and 538 indicate there is a 60% chance that a user will select list of user interactions 528 within user input sequence choice box 524 by utilizing user selectable field 530, and there is a 20% chance that a user will select list of user interactions 534 contained within user input sequence box 526 by utilizing user selectable field 536. In the present example, there may be other user input sequences stored within the database and associated with a present data processing system stimulus event that are not displayed within secondary window 520. Some user input sequences associated with the present data processing system stimulus event may have probabilities of execution that fall below a specified minimum probability and are therefore not displayed within a user input sequence choice box. Such a threshold level of execution probability may be selected by a user to avoid filling the display with too many user input sequence choice boxes. The number of user input sequence choice boxes may also be limited by an absolute number. For example, a user may specify that only the three (3) highest probability user input sequence choice boxes be displayed.

Those skilled in the art will recognize that there are several methods which may be utilized to display predicted data processing system user input sequence choices and indicate the probability of each choice being executed, and providing means for a user to select a desired predicted data processing user input sequence. For example, the percentage of probability of execution may be textually displayed, or graphically indicated utilizing variations in color, brightness (including dithering), animation, or other methods of graphic indicia. List of user interactions 528 and 534 may be communicated to a user textually, or graphically, by utilizing icons representing commands, data, or selection of specified parameters.

Those skilled in the art should also recognize that the present invention may be utilized in a multimedia environment. For example, data processing system stimulus events may be identified, and data processing system user input sequences may be monitored and stored, during a multimedia presentation. Within a multimedia environment, the time domain aspects of the present invention become particularly relevant. For example, should the present invention be utilized to control a multimedia presentation, the timing of a sequence of data processing system user inputs may be important to presenting the desired portions of the multimedia presentation. Therefore, data processing system user input sequences utilized in a multimedia environment should be monitored, stored and initiated with suitable means and accuracy to preserve the timing of the initial user input sequence.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for enhancing user efficiency in initiating a sequence of data processing system user inputs, said method comprising the data-processing-system-implemented steps of:

identifying a stimulus event within said data processing system;

storing, within said data processing system, each sequence of data processing system user inputs which occurs in response to each subsequent occurrence of said stimulus event;

thereafter calculating a positive probability of a user executing a selected sequence of data processing system user inputs in response to a subsequent occurrence of said stimulus event, utilizing said stored sequences of data processing system user inputs;

displaying, within said data processing system in response to a subsequent occurrence of said stimulus event, an identification of one or more selected sequences of data processing system user inputs;

indicating said calculated positive probability of a user executing each of said identified one or more selected sequences of data processing system user inputs; and automatically initiating one of said identified one or more selected sequences of data processing system user inputs in response to a user input, wherein a user's efficiency in performing a sequence of data processing system inputs within said data processing system is enhanced.

2. The method in a data processing system for enhancing user efficiency in initiating a sequence of data processing system user inputs according to claim 1, wherein the step of displaying an identification of one or more selected sequences of data processing system user inputs comprises the step of displaying each individual user input within said one or more selected sequences of data processing system user inputs within said data processing system in response to said subsequent occurrence of said stimulus event.

3. The method in a data processing system for enhancing user efficiency in initiating a sequence of data processing system user inputs according to claim 2, wherein the step of displaying each individual user input within said one or more selected sequences of data processing system user inputs within said data processing system in response to said subsequent occurrence of said stimulus event comprises the step of displaying a decision tree which includes a graphic depiction of each data processing system prompt for user interaction.

4. The method in a data processing system for enhancing user efficiency in initiating a sequence of data processing system user inputs according to claim 1, wherein the step of displaying an identification of one or more selected sequences of data processing system user inputs comprises the step of displaying an identification of only selected sequences of data processing system user inputs that have an associated positive probability of a user executing said selected sequence of data processing system user inputs which exceeds a specified threshold probability.

5. The method in a data processing system for enhancing user efficiency in initiating a sequence of data processing system user inputs according to claim 1, wherein the step of indicating said calculated positive probability of a user executing each of said identified one or more selected sequences of data processing system user inputs comprises the step of displaying textual indicia of said calculated positive probability of a user executing each of said identified one or more selected sequences of data processing system user inputs.

6. The method in a data processing system for enhancing user efficiency in initiating a sequence of data processing system user inputs according to claim 1, wherein the step of indicating said calculated positive probability of a user executing each of said identified one or more selected sequences of data processing system user inputs comprises the step of graphically displaying indicia of said calculated positive probability of a user executing each of said identified one or more selected sequences of data processing system user inputs.

7. The method in a data processing system for enhancing user efficiency in initiating a sequence of data processing system user inputs according to claim 6, wherein the step of graphically displaying indicia of said calculated positive probability of a user executing each of said identified one or more selected sequences of data processing system user inputs comprises the step of varying a brightness of said graphical indicia in relation to said calculated positive probability of a user executing each of said one or more selected sequences of data processing system user inputs.

8. A data processing system for enhancing user efficiency in initiating a sequence of data processing system user inputs, said system comprising:

means for identifying a stimulus event within said data processing system;

means for storing, within said data processing system, each sequence of data processing system user inputs which occurs in response to each subsequent occurrence of said stimulus event;

means for calculating a positive probability of a user executing a selected sequence of data processing system user inputs in response to a subsequent occurrence of said stimulus event, utilizing said stored sequences of data processing system user inputs;

means for displaying, within said data processing system in response to a subsequent occurrence of said stimulus event, an identification of one or more selected sequences of data processing system user inputs;

means for indicating said calculated positive probability of a user executing each of said identified one or more selected sequences of data processing system user inputs; and means for automatically initiating one of said identified one or more selected sequences of data processing system user inputs in response to a user input, wherein a user's efficiency in performing a sequence of data processing system inputs within said data processing system is enhanced.

9. The data processing system for enhancing user efficiency in initiating a sequence of data processing system user inputs according to claim 8 wherein said means for displaying an identification of one or more selected sequences of data processing system user inputs comprises means for displaying each individual user input within said one or more selected sequences of data processing system user inputs within said data processing system in response to said subsequent occurrence of said stimulus event.

10. The data processing system for enhancing user efficiency in initiating a sequence of data processing system user inputs according to claim 9, wherein said means for displaying each individual user input within said one or more selected sequences of data processing system user inputs within said data processing system in response to said subsequent occurrence of said stimulus event comprises means for displaying a decision tree which includes a graphic depiction of each data processing system prompt for user interaction.

11. The data processing system for enhancing user efficiency in initiating a sequence of data processing system user inputs according to claim 8, wherein said means for displaying an identification of one or more selected sequences of data processing system user inputs comprises means for displaying an identification of only selected sequences of data processing system user inputs that have an associated positive probability of a user executing said selected sequence of data processing system user inputs which exceeds a specified threshold probability.

12. The method in a data processing system for enhancing user efficiency in initiating a sequence of data processing system user inputs according to claim 8, wherein said means for indicating said calculated positive probability of a user executing each of said identified one or more selected sequences of data processing system user inputs comprises means for displaying textual indicia of said calculated positive probability of a user executing each of said identified one or more selected sequences of data processing system user inputs.

13. The data processing system for enhancing user efficiency in initiating a sequence of data processing system user inputs according to claim 8, wherein said means for indicating said calculated positive probability of a user executing each of said identified one or more selected sequences of data processing system user inputs comprises means for graphically displaying indicia of said calculated positive probability of a user executing each of said identified one or more selected sequences of data processing system user inputs.

14. The method in a data processing system for enhancing user efficiency in initiating a sequence of data processing system user inputs according to claim 13, wherein said means for graphically displaying indicia of said calculated probability of a user executing each of said identified one or more selected sequences of data processing system user inputs comprises means for varying a brightness of said graphical indicia in relation to said calculated positive probability of a user executing each of said one or more selected sequences of data processing system user inputs.

* * * * *